Aug. 4, 1931.  J. JUDT  1,817,082
SAW FILING MACHINE
Filed June 19, 1929  4 Sheets-Sheet 1
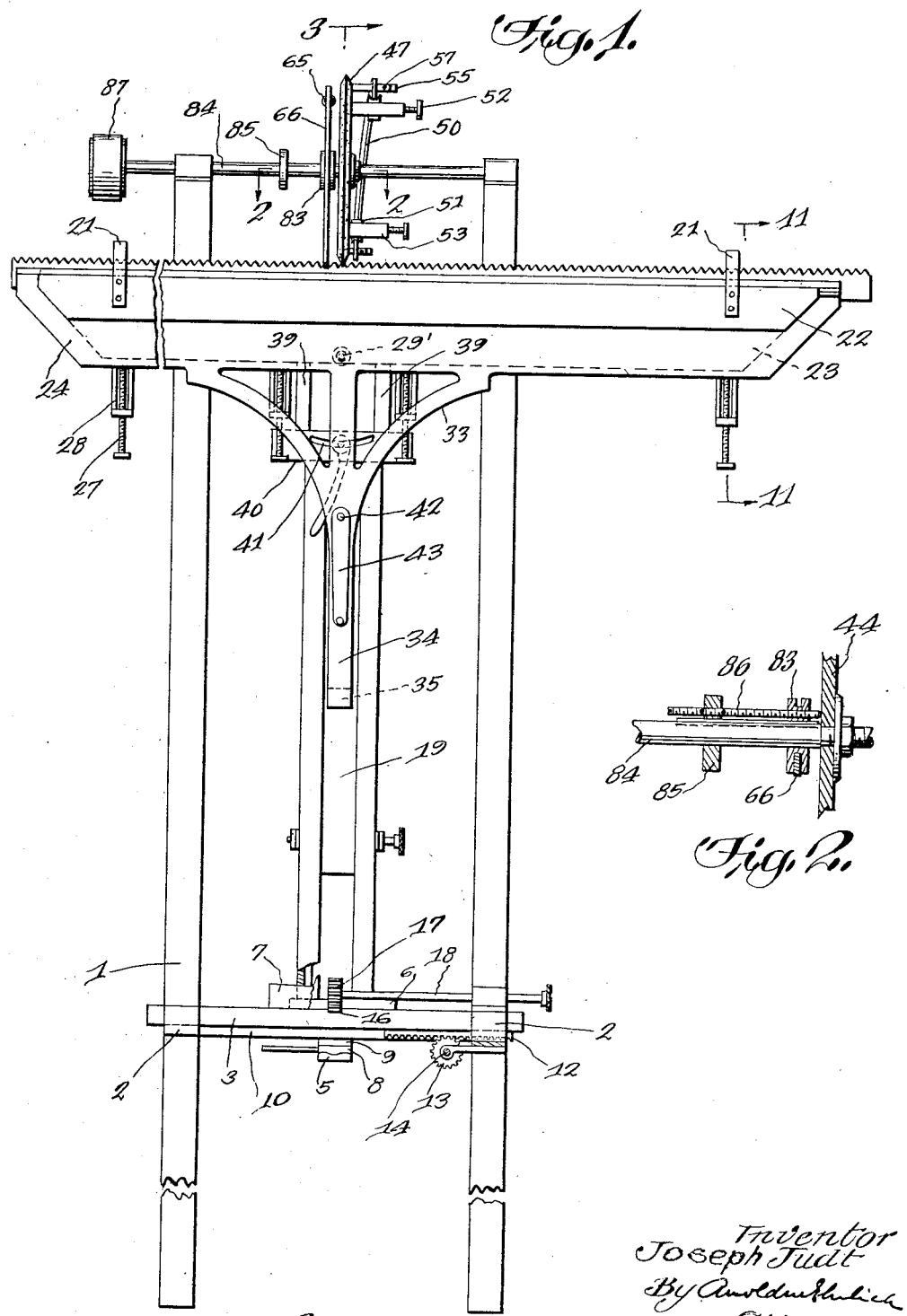

Aug. 4, 1931.  J. JUDT  1,817,082
SAW FILING MACHINE
Filed June 19, 1929  4 Sheets-Sheet 2
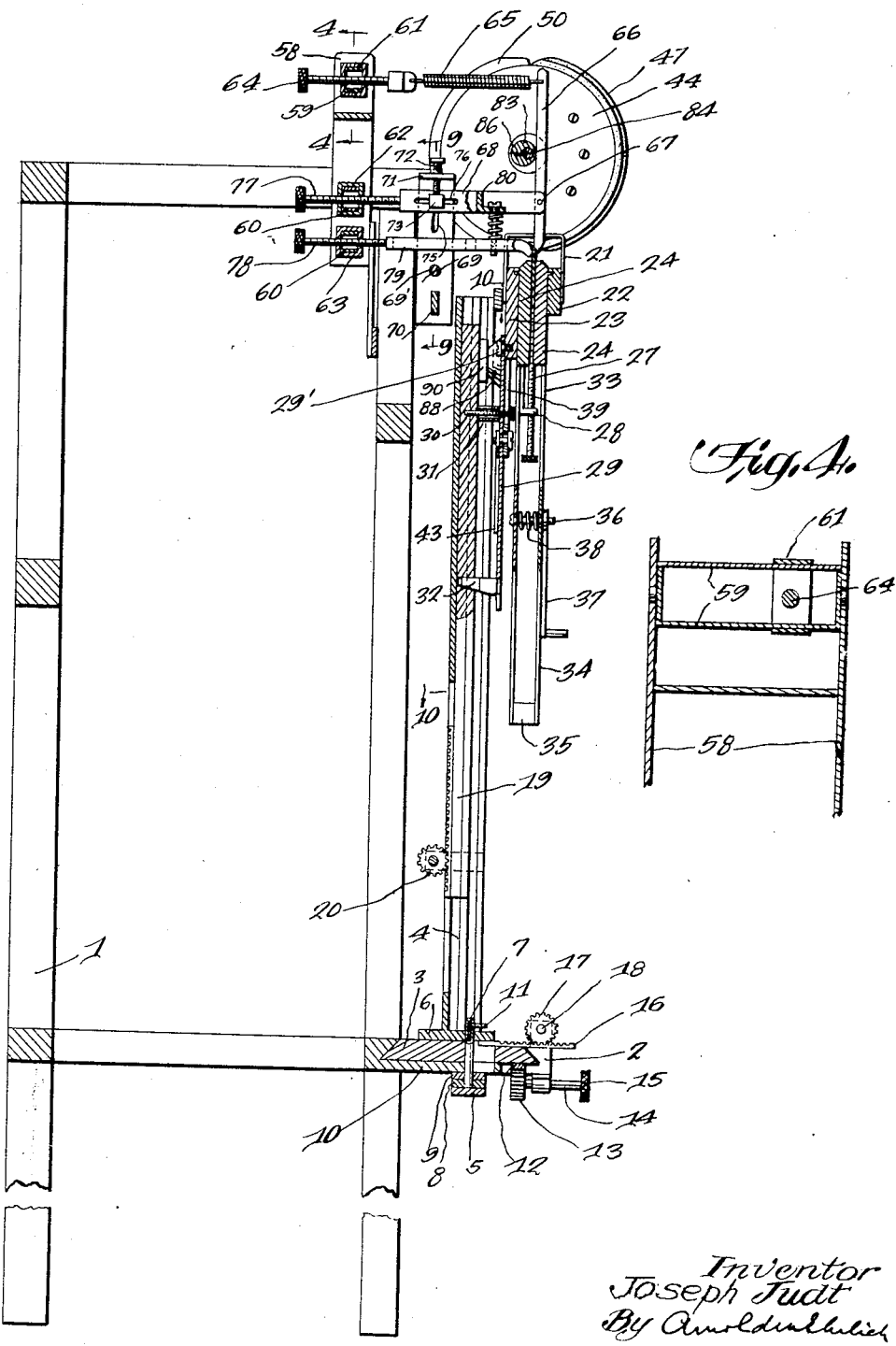
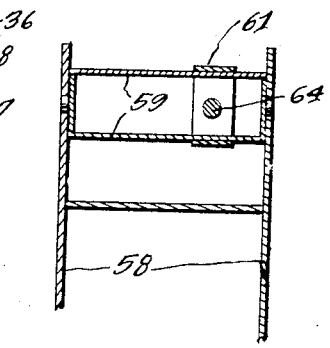
Inventor
Joseph Judt
By Arnold Wilhelm
Attorney Aug. 4, 1931.  J. JUDT  1,817,082
SAW FILING MACHINE
Filed June 19, 1929   4 Sheets-Sheet 3
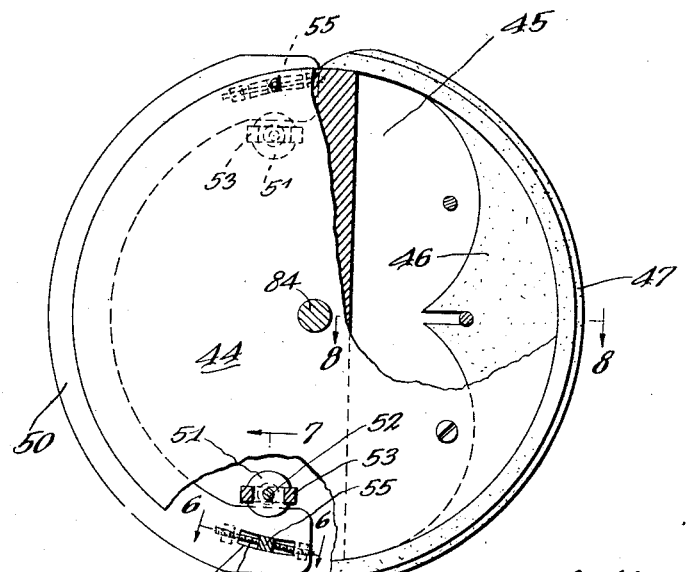
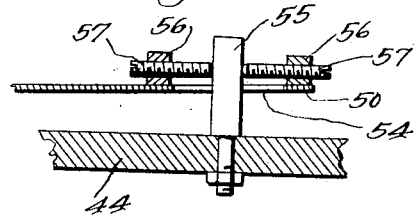
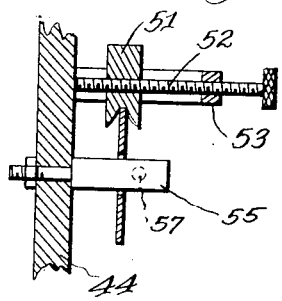
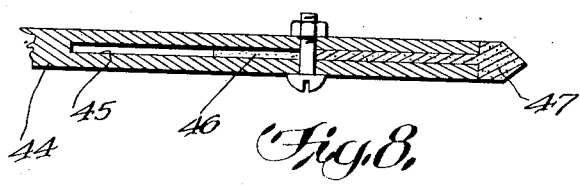
Inventor
Joseph Judt
By Arnold Ehrlich
Attorney Aug. 4, 1931.  J. JUDT  1,817,082
SAW FILING MACHINE
Filed June 19, 1929  4 Sheets-Sheet 4
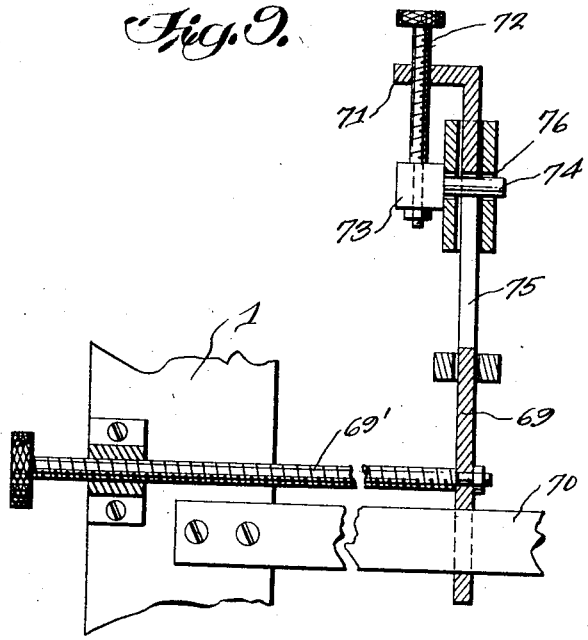
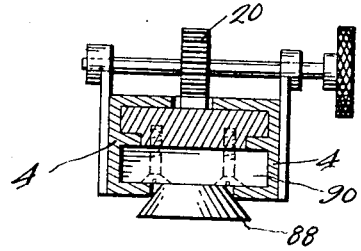
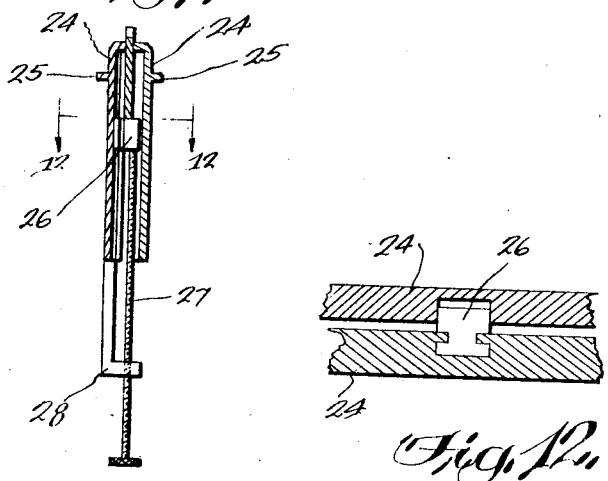
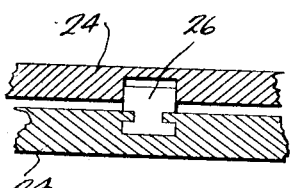
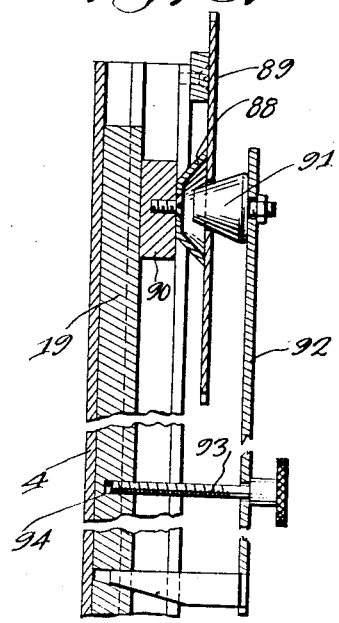
Inventor
Joseph Judt
By his Attorney Patented Aug. 4, 1931

1,817,082

UNITED STATES PATENT OFFICE

JOSEPH JUDT, OF CHICAGO, ILLINOIS

SAW FILING MACHINE

Application filed June 19, 1929. Serial No. 372,127.

This invention relates to a new and improved device for filing and setting saw teeth.

One of the objects of my invention is the provision of a device of the above character which is so constructed and arranged that the teeth of various types of saws may be simultaneously filed and set to the proper angle relative to the body of the saw.

Another object of the invention is the provision of a saw filing and setting device which is so constructed that the same may be readily adjusted to accommodate saws of various styles and operate upon the different styles and types in a similar manner together with novel means for clamping the different type saws in proper position.

A further object of the invention is the provision of a device of the above character having novel means for advancing the saw blade as the teeth are sharpened and set so as to consecutively operate on the teeth and novel means for adjusting the setting device for setting teeth of different sizes.

A still further object of the invention is the provision of a device of the above character including novel means for clamping the saws in position and includes adjustable means for accommodating saw blades of different widths.

With the above and other objects in view the invention consists in the novel features of construction, the combination and arrangement of parts hereinafter more fully set forth, pointed out in the accompanying drawings, in which:

Figure 1 is a front elevation of my improved saw filing and setting device.

Figure 2 is a detail section on the line 2—2 of Figure 1.

Figure 3 is a vertical section on the line 3—3 of Figure 1.

Figure 4 is a detail section on the line 4—4 of Figure 3.

Figure 5 is a side elevation of the filing and advancing disc with parts thereof broken away and shown in cross section.

Figure 6 is a detail section on the line 6—6 of Figure 5.

Figure 7 is a detail section on the line 7—7 of Figure 5.

Figure 8 is a detail section on the line 8—8 of Figure 5.

Figure 9 is a detailed enlarged section on the line 9—9 of Figure 3.

Figure 10 is a detail section on the line 10—10 of Figure 3.

Figure 11 is a detail section on the line 11—11 of Figure 1.

Figure 12 is a detail section on the line 12—12 of Figure 11, and

Figure 13 is an enlarged detail section of the means for clamping a circular saw in position.

Referring more particularly to drawings wherein I have illustrated the main embodiments of my invention it will be noted that the entire device is mounted upon a suitable frame 1 that may be constructed in a suitable manner for supporting the operative parts of my device. One of the horizontal pieces at each side of the frame extends a suitable distance beyond the uprights and forms suitable guide arms 2 for the movable base piece 3 of the saw supporting frame which includes the spaced channeled uprights 4.

The saw supporting frame is mounted for both longitudinal and lateral adjustment and also for slight swinging movement on the pivot pin 5. The transverse bottom member 6 of the saw supporting frame is slotted and the slot is aligned with a slot in the pin 5 to receive the locking wedge 7 to securely hold the saw frame against lateral and rotative movement. This wedge 7 after being placed in position is securely engaged with the base member 3 by the cam action of the rotative cam head 8 acting upon the head of the pivot pin 5 and a washer 9 between the cam head and the lower face of a transverse plate 10 supported at its ends by the arms 2. A set screw 11 carried by pin 5 also serves to retain the wedge 7 against movement.

Attached to the lower face of the base member 3 is a rack bar 12 engaged by a pinion 13 on the inner end of the shaft 14 and on the outer end of shaft 14 is a finger wheel 15 whereby the shaft may be rotated to move the base member laterally of the frame 1.

It will be noted that the shaft 14 is mounted in a suitable bearing supported by one of the arms 2. Slidably mounted upon the upper face of base member 3 is a rack bar 16 the inner end of which is connected to the base piece 6 and cooperates with a pinion 17 on the inner end of shaft 18. The shaft 18 is mounted in a suitable bearing on the upper face of the arm 2 on which the shaft 14 is mounted and the outer end of this shaft 18 carries a hand wheel for rotating pinion 17 to adjust the saw supporting frame toward and away from the frame 1.

Slidably mounted in the channeled uprights 4 is a rack bar 19 engaged by a pinion 20 rotatably supported by the uprights 4 whereby the rack bar may be readily raised and lowered. The saw clamping means comprises the spaced inverted U-shaped members 21 supporting the grooved guide plates 22 and 23 arranged upon opposite sides of the saw engaging plates 24. The plates 24 are provided upon their outer faces with longitudinal ribs 25 movably mounted in the grooves in the guide plates 22 and 23. Slidably mounted in suitable grooves in the opposed faces of the plates 24 are the supporting blocks 26 for engaging the inner or back edge of the saw to support the same in proper position to be filed and set. These blocks 26 are connected to the adjusting screws 27 threaded through the depending brackets 28 carried by one of the plates 24. The lower ends of these screw carried finger pieces for rotating the same.

Pivotally connected to the outer face of plate 23 and depending downwardly therefrom is a supporting plate 29 which is connected to the rack bar 19 by means of the adjustable screw 30 and plate 29 is maintained in spaced relation with the rack bar 19 by means of a sleeve 31 mounted on the set screw and disposed between the plate 29 and rack bar 19. The lower end of the plate 29 is formed with a slot and arranged therein is a tapered lug 32 engaging a recess in rack 19 to assure positive movement of the plate 29 and members carried thereby when movement is imparted to the rack bar.

Depending from the lower edges of plates 24 are the brackets 33 which terminate at their lower ends into spaced arms 34 connected at their outer ends by means of a spacing block 35. An adjusting bolt 36 extends through the arms 34 at their upper ends and an operating handle 37 is threaded onto the bolt whereby to move said arms toward each other. These arms 34 are moved toward each other. These arms 34 are moved toward and away from each other for the purpose of clamping the saw between the plates 24. The arms 34 are normally urged apart by means of a coil spring 38 mounted upon bolt 36 and bearing against arms 36 as shown in Figure 3. From the above it will be apparent that by rotating pinion 20 and moving rack bar 19 the entire saw clamping means may be readily adjusted vertically relative to the frame member 1.

As a general rule most cross cut saws are either tapered or rounded toward their ends and in order to tilt the clamping plates 24 to bring the teeth at the ends of the saws into engagement with the filing and setting means the guide plates 22 and 23 and plates 24 are rocked upon the pivot pin 29. Depending from plate 23 are spaced arms 39 supporting at their lower ends a cross piece 40 formed with an arcuate slot 41 adapted to receive a set screw 42 which extends through plate 29. Threaded on the end of the set screw 42 and engaging plate 29 is a clamping lever 43 which can be screwed down tight for retaining the guide and clamping plates in adjusted positions.

The saw filing or sharpening and advancing means includes a disc 44 one edge of which is slotted inwardly to the center of the disc to form a substantially arcuate shaped pocket 45 in which is arranged the web 46 of the arcuate shaped emery or sharpening member 47. The web 46 is formed with a central extension having a slot 48 adapted to receive one of the screws 49 which are used to tighten the spaced walls of the pocket 45 onto the web. From this it will be apparent that the member 47 is securely held in place relative to the disc 44.

The arcuate guide or advancing plate 50 is supported at each end by means of the adjustable blocks 51 formed at one end with V-shaped notches to receive the ends of plate 50 and are adjustably mounted on screws 52 carried by brackets 53 which in turn are attached to the discs 44 whereby the ends of the plate 50 can be moved toward and away from the disc 44 in accordance with the amount of advancement of the saw blade required. The ends of the plate 50 are provided with slots 54 to receive the detachable studs 55 bolted to the discs. Spaced internally threaded lugs 56 are carried by plate 50 and adjustably mounted in these lugs are the set screws 57 the inner ends of which engage opposite sides of the studs 55 to move the ends of plate 50 toward and away from the ends of the emery or sharpening member 47 to properly position the same relative the ends of member 47 so that member 47 will engage the proper tooth of the saw blade at the proper time.

In order to set the teeth to the proper angle directly after filing or sharpening I provide suitable mechanism mounted adjacent the disc 44 and include a supporting frame comprising spaced parallel uprights 58 mounted on the frame 1. Extending between the uprights 58 are a plurality of spaced guide slots 59 and 60 arranged in pairs, as shown, with the pair of slots 59 arranged near the upper ends of the uprights while the slots 60 comprise two pairs arranged adjacent the lower ends of the uprights.

Slidably mounted upon the spaced pairs of slots are the sleeves 61, 62, and 63, the sleeve 61 carrying a set screw 64 adjustable therethrough and connected at its inner end to a coil spring 65. The outer end of spring 65 is connected to the upper end of a pivoted arm 66, the pivot point of which is adjacent the lower end of the same as shown at 67. This pivot point 67 is at the outer end of the U-shaped member 68 which is adjustably supported on the bracket 69 which is adjustably mounted on the transverse bar 70, secured to the frame 1.

The upper end of the bracket is arranged at right angles to form a flange 71 formed with a threaded perforation in which is adjustably mounted a set screw 72 connected to the head 73 of pin 74 that operates in a slot 75 longitudinally of bracket 69 and slots 76 extending longitudinally in the arms of the U-shaped member 68. From this structure it will be apparent that arm 66 can be adjusted laterally as well as vertically to accommodate the same to the different size teeth on the various types of saws. Connected to the inner end of the U-shaped member 68 is a set screw 77 which is adjustably mounted in the sleeve 62 on one pair of the slots 60 whereby the member 68 can be readily adjusted laterally for properly positioning the arm 66. The bracket 69 is laterally adjusted by means of a screw bolt 69 that is adjustably mounted on frame 1.

Adjustably mounted in sleeve 63 is a set screw 78 connected to the inner end of a bar 79 the outer end of which is forked, with the extremities of the forked part rounded off for engagement with the saw teeth and cooperate with the lower end of arm 66 to set the teeth to the proper angle. In order to maintain bar 79 in the proper horizontal plane an angle bracket 80 is carried by the U-shaped member 68 and loosely mounted in the horizontal portion of this bracket is a bolt 81 the lower threaded end of which is adjustably connected to bar 79 and mounted on this bolt is a coil spring 82 disposed between bar 79 and member 68 for normally maintaining the head of bolt 81 seated on the horizontal portion of bracket 80.

The arm 66 is rocked upon the pivot point 67 for causing the lower end thereof to strike against the outer face of the saw teeth to forcibly engage them with the forked outer end of the bar 79 whereby to properly set the teeth to the desired angle. In order to cause rocking movement of arm 66 at predetermined intervals a grooved cam member 83 is mounted on the shaft 84 which rotatably supports disc 44 and the parts carried thereby. The shaft 84 is mounted in suitable bearings at the upper end of frame 1. The arm 66 is received in the circumferential groove formed in cam 83 to retain the same against lateral movement relative the cam.

The cam 83 is keyed to the shaft 84 to rotate therewith but mounted to slide on the shaft so that it can be adjusted toward and away from the disc. For adjusting the cam axially on shaft 84, a collar 85 is fixed to the shaft 84 in spaced relation to the cam 83 and carried by collar 85 is a set screw 86 fixed against longitudinal movement relative collar 85 and adjustably connected to the cam 83 whereby turning movement of the set screw will readily move cam 83 along the shaft 84. For imparting rotative movement to shaft 84 a pulley 87 is connected to one end thereof and power may be applied to the pulley in any desired manner.

In using my improved device a saw is clamped between the clamping plates and the blocks 26 adjusted to engage the back of the saw blade to hold the same in position so that the teeth are arranged to be engaged by the emery 47. As the disc 44 revolves the plate 50 will engage the teeth of the saw for moving the saw and plates 24 longitudinally between guide plates 22 and 23. Simultaneously with the filing or sharpening of the saw teeth they are set through the movement of arm 66 operated by cam 83 on the shaft 84.

In Figure 13 I have illustrated that part of my improved device which is used for securing a circular saw in position to be operated upon by the sharpening member 47. In this form of the invention the cup like member 88 is used to form an engaging surface for a circular saw 89. The cup member 88 has an integral set screw threaded into a bearing block 90 on rack bar 19. Circular saws are usually formed with a central opening which will receive the conical bearing and supporting element 91 which is detachably secured to the upper end of a laterally adjustable plate 92.

The plate 92 has a transverse opening below cone member 91 to receive the smooth shank portion of an adjusting screw 93 the inner end of which is threaded into a threaded bore 94 in rack bar 19 and the outer end of screw 93 carries a thumb wheel 95 for readily adjusting said screw to move the cone 91 into engagement with the saw.

It will be apparent from the foregoing description that the parts of my improved device are so constructed and arranged that they may be readily adjusted to accommodate the same to saws of various sizes and shapes and the filing or sharpening of the teeth may be adjusted so that every adjacent tooth may be sharpened or every other tooth may be sharpened and the teeth set to the desired angle after being sharpened.

Claims:

1. In a device of the class described, a supporting frame, a saw supporting frame mounted on the first frame for movement independent thereof, a saw clamp mounted for vertical adjustment in the second frame, movably mounted supporting blocks adjustable in said clamp for engaging a saw in the clamp for supporting saws of different widths, means for mounting said clamp for longitudinal movement, a movable sharpener for engaging the teeth of a saw in the clamp, and means movable with the sharpener for imparting longitudinal movement to the saw.

2. In a device of the class described, a supporting frame, a saw clamp supporting frame, a saw clamp supporting member mounted for vertical adjustment in said saw clamp supporting frame, a saw clamp mounted in said supporting member for longitudinal movement, adjustable means for mounting saws of different widths in said clamp, a rotatably mounted sharpening member above said clamp for engaging the teeth of a saw in the clamp, and means rotatable with said sharpening member for engaging the saw teeth to impart longitudinal movement to the saw upon each revolution of the sharpening member.

In witness whereof I have hereunto set my hand this 29th day of May, A. D. 1929.

JOSEPH JUDT.